(12) United States Patent
Harland et al.

(10) Patent No.: US 7,992,835 B2
(45) Date of Patent: Aug. 9, 2011

(54) KINEMATIC MIRROR MOUNT ADJUSTABLE FROM TWO DIRECTIONS

(75) Inventors: Mark A. Harland, Hilton, NY (US); Mark E. Bridges, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 121 days.

(21) Appl. No.: 12/469,894

(22) Filed: May 21, 2009

(65) Prior Publication Data

US 2010/0296188 A1 Nov. 25, 2010

(51) Int. Cl.
A47G 1/24 (2006.01)
(52) U.S. Cl. ........ 248/485; 248/466; 248/467; 248/474; 359/811; 359/871; 359/872; 359/874
(58) Field of Classification Search .................. 248/466, 248/467, 474, 476, 479, 485; 359/811, 871, 359/872, 874, 876
See application file for complete search history.

(56) References Cited

U.S. PATENT DOCUMENTS

| | | | |
|---|---|---|---|
| 3,357,268 A * | 12/1967 | Richter | 74/89.23 |
| 3,407,018 A * | 10/1968 | Miller | 359/896 |
| 3,566,101 A * | 2/1971 | Hagner et al. | 248/466 |
| 4,120,586 A * | 10/1978 | Lessner | 356/334 |
| 4,293,112 A | 10/1981 | Horton | |
| 4,401,288 A | 8/1983 | Thompson | |
| 4,573,794 A * | 3/1986 | Covey et al. | 356/451 |
| 4,712,444 A * | 12/1987 | Lewis | 74/490.13 |
| 4,925,288 A | 5/1990 | Harris | |
| 5,004,205 A | 4/1991 | Brown et al. | |
| 5,400,184 A | 3/1995 | Kuklo | |
| 5,425,523 A | 6/1995 | Madey et al. | |
| 5,505,422 A * | 4/1996 | Elterman | 248/476 |
| 5,798,879 A * | 8/1998 | Salvio | 359/857 |
| 6,053,469 A | 4/2000 | Burgarella | |
| 6,322,223 B1 * | 11/2001 | Smith et al. | 359/871 |
| 6,543,740 B2 * | 4/2003 | Gaunt et al. | 248/476 |
| 6,568,647 B2 * | 5/2003 | Graves et al. | 248/476 |
| 7,268,960 B2 * | 9/2007 | Vishnia | 359/819 |
| 2004/0257661 A1 | 12/2004 | Gao et al. | |
| 2008/0037150 A1 * | 2/2008 | Heuser et al. | 359/874 |

FOREIGN PATENT DOCUMENTS

JP 2002 335047 A 11/2002

OTHER PUBLICATIONS

LINOS: "Catalog 2003", Jan. 1, 2003, LINOS, Goettingen, XP002592612, pp. L21-L21, p. 121.

* cited by examiner

*Primary Examiner* — Terrell McKinnon
*Assistant Examiner* — Bradley H Duckworth
(74) *Attorney, Agent, or Firm* — Kevin E. Spaulding

(57) ABSTRACT

A kinematic optical mount comprising a frame supporting an optical element; a base member having first and second surfaces and providing magnetic attraction to seat the frame against first, second, and third point contacts. The kinematic optical mount further includes threaded yaw and pitch adjustment cavities extending through the base member from the first surface to the second surface, together with threaded yaw and pitch adjustment inserts that can be inserted into the yaw and pitch adjustment cavities from either the first or second surfaces of the base member enabling adjustment of two of the point contacts from the direction of the either the first or second surfaces.

23 Claims, 9 Drawing Sheets

KINEMATIC MIRROR MOUNT ADJUSTABLE FROM TWO DIRECTIONS

CROSS REFERENCE TO RELATED APPLICATIONS

The present invention is related to commonly assigned U.S. patent application Ser. No. 12/432,856 filed Apr. 30, 2009, entitled "Digital Projector using Arrayed Light Sources" by Harland et al., and to commonly assigned U.S. patent application Ser. No. 12/432,999 filed Apr. 30, 2009, entitled "Beam Alignment Chamber Providing Divergence Correction" by Silverstein et al.

FIELD OF THE INVENTION

This invention generally relates to an apparatus for precision mounting and positioning of a component and more particularly relates to an apparatus for mounting and adjusting the position of a mirror or other reflective optical element.

BACKGROUND OF THE INVENTION

Proper alignment of mirrors and other types of reflective optical surfaces is of particular value in optical systems that require accurate redirection of light. This can be a particularly important requirement for a system that uses laser light. Without high-precision alignment, for example, minor deviation of a laser beam for a measurement instrument or for an imaging apparatus can seriously compromise system performance.

Conventional approaches for mirror mounting and adjustment often require precision machining and a complex arrangement of actuators for making slight adjustments to mirror position. This approach may be justifiable for precision alignment of larger mirrors that may be used with higher-power lasers, using solutions such as that taught in U.S. Pat. No. 5,004,205 entitled "High-Range and Resolution Determinate Mount and Positioner" to Brown et al., for example. However, with the advent of solid-state lasers and laser arrays, used for various types of instrument, communications, illumination, and imaging systems, there is a demand for more compact mounting mechanisms with fewer parts and allowing lower cost fabrication and assembly.

In general, for proper alignment of an optical component with respect to an optical axis, a mount mechanism for a mirror must allow the capability for precision adjustment about each of two orthogonal axes. In some systems, the use of a fixture for alignment may be advantageous. This approach is taught, for example, in U.S. Pat. No. 6,053,469 entitled "Low-Cost 2-Axis Mirror Mount" to Burgarella. However, fixturing can be impractical for some systems, particularly where heat or vibration can be a factor. In addition, fixturing is less satisfactory where a light source may need to be replaced.

Compact spacing can be another requirement for a mirror mount. The need for compact packaging not only affects the size, weight, and other physical attributes of the mirror mount, but can also constrain access to adjustment actuators. Conventional solutions that allow access to mirror adjustments once the mirror mount is installed tend to work against the requirements to constrain the overall profile and mechanical footprint of the mirror mount.

Thus, it is seen that there is a need for a compact mirror mount that allows precision adjustment of mirror alignment from multiple directions and uses a small number of component parts.

SUMMARY OF THE INVENTION

The present invention addresses the need for improved mounting of mirrors and other reflective, refractive, or light conditioning optical components by providing a kinematic optical mount comprising:
  a reflective optical element;
  a frame supporting the reflective optical element;
  a base member having first, second, and third point contacts, the base member having a first surface configured for fastening to a chassis and a second surface opposite and substantially parallel to the first surface;
  an attraction means providing an attractive force to attract the frame to the base member seating the frame against the first, second, and third point contacts;
  a threaded yaw adjustment cavity extending through the base member from the first surface to the second surface;
  a threaded yaw adjustment insert that enables adjustment for re-positioning the first point contact from the direction of the first surface when inserted in the threaded yaw adjustment cavity in a first orientation and enables adjustment for re-positioning the first point contact from the direction of the second surface when inserted in the threaded yaw adjustment cavity in an opposite orientation;
  a threaded pitch adjustment cavity extending through the base member from the first surface to the second surface; and
  a threaded pitch adjustment insert that enables adjustment for re-positioning the second point contact from the direction of the first surface when inserted in the threaded pitch adjustment cavity in a first orientation and enables adjustment for re-positioning the second point contact from the direction of the second surface when inserted in the threaded pitch adjustment cavity in an opposite orientation.

It is an advantage of the present invention that it provides an apparatus and method for optical component mounting that can be configured to allow adjustment from either of two opposite directions.

It is another advantage of the present invention that it provides an optical mount that is compact, uses a small number of component parts, and is readily adapted to mounting from either of two opposite surfaces. The flexibility in the adjustment direction and the mounting surface allows the optical mount to be used in a wide variety of system configurations.

These and other features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and may not be drawn with intent to show actual size or scale. Because of the relative dimensions of the component parts for the mirror mount of the present invention, some exaggeration is necessary in order to emphasize basic structure, shape, and principles of operation.

The terms "bottom" and "top" are used to indicate opposite surfaces or other features of components as described and illustrated herein, but are not intended to limit a component to a vertical orientation. One advantage of the mirror mount of the present invention relates to its adaptability for orientation in other than vertical directions, such as in a horizontal direction. For ease of description and reference, only the vertical orientation is shown in the examples given herein.

Embodiments of the present invention address the need for an optical mount that is compact, has a relatively small parts count, and is adaptable for mounting singly or in an array in any of various types of optical systems. Kinematic design enables an optical mount to maintain a component in a fixed position without over constraint. This component can be an optical element such as a mirror or other reflective element, a polarizer, a lens or other type of refractive element, an optical grating, or some other light-redirecting, measurement, or light-conditioning component, for example.

Figure 1:
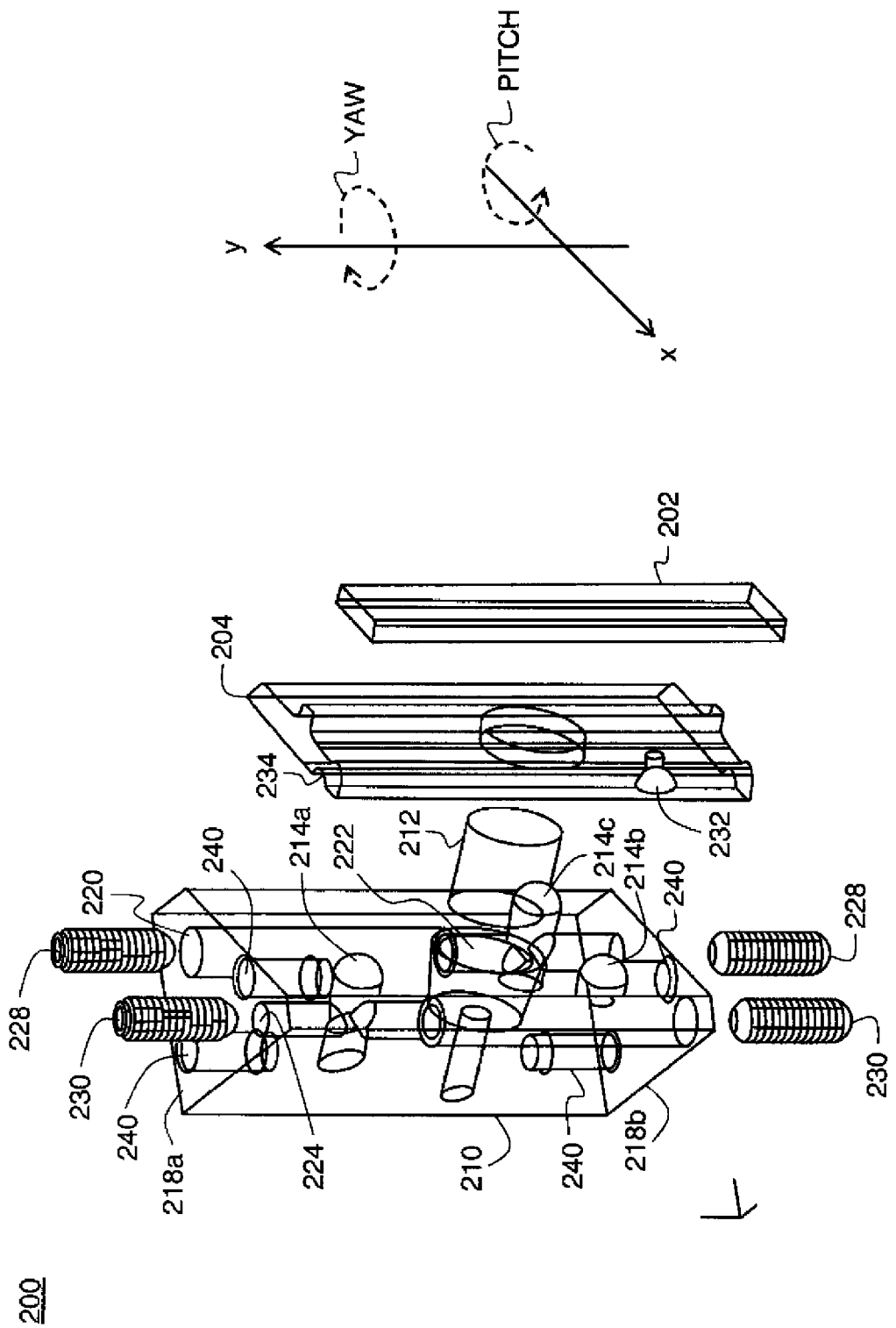
FIG. 1 is an exploded perspective of an optical mount according to an embodiment of the present invention.

Referring to FIG. 1, there is shown, in an exploded view presentation, component parts of a kinematic optical mount 200 for a reflective element 202. A frame 204 supports the reflective element 202 and is kinematically secured against a base member 210 by a magnet 212 that provides an attractive force against a 3-point contact. Magnet 212 is seated within a cavity 222. Pitch adjustment ball 214a, fixed ball 214b, and yaw adjustment ball 214c are seated in sockets formed on a surface of base member 210 to provide three contact points for the 3-point contact. The magnet 212 should be mounted so that its force is concentrated within the triangle formed by the three contact points.

In the embodiment shown in FIG. 1, base member 210 has two alternate mounting surfaces 218a and 218b, either of which can be used for securing base member 210 to a chassis or other body.

The design of base member 210 allows optical mount 200 to be configured so that it allows pitch and yaw adjustment from either top mounting surface 218a or bottom mounting surface 218b, depending on the orientation from which the adjustment hardware is installed. A yaw adjustment cavity 220 extends through base member 210 between top mounting surface 218a and bottom mounting surface 218b and is threaded over at least a portion of its length. Similarly, a pitch adjustment cavity 224 also extends through base member 210 between surfaces 218a and 218b and is threaded over at least a portion of its length.

A threaded yaw adjustment insert 228 is provided for fitting into the yaw adjustment cavity 220, either from top mounting surface 218a or bottom mounting surface 218b. Likewise, a threaded pitch adjustment insert 230 is provided for fitting into the pitch adjustment cavity 224, either from top mounting surface 218a or bottom mounting surface 218b. Both threaded yaw adjustment insert 228 and threaded pitch adjustment insert 230 are adjustment screws in one embodiment.

Figure 2A:
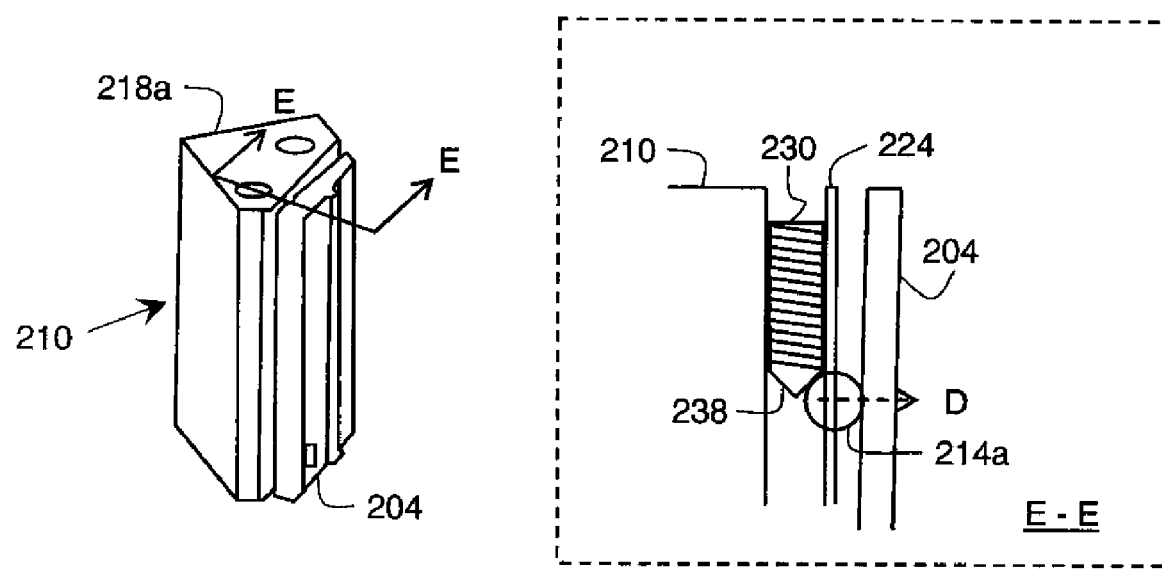
FIG. 2A is a partial cutaway view showing pitch adjustment components in one embodiment.

In a preferred embodiment of the present invention, the adjustment screws will have a conical taper, typically on the end of the adjustment screws. The partial cutaway view of FIG. 2A shows an embodiment of threaded pitch adjustment insert 230 having a tapered end 238 that sits in contact with pitch adjustment ball 214a to force it outward against frame 204 in a direction D. In this configuration, threaded pitch adjustment insert 230 is installed from the top mounting surface 218a. As the threaded yaw adjustment insert 228 and the threaded pitch adjustment insert 230 are turned in or out, the conical tapers push the pitch adjustment ball 214a, and the yaw adjustment ball 214c in or out accordingly, thereby providing the pitch and yaw adjustment for the reflective element 202.

Figure 2B:
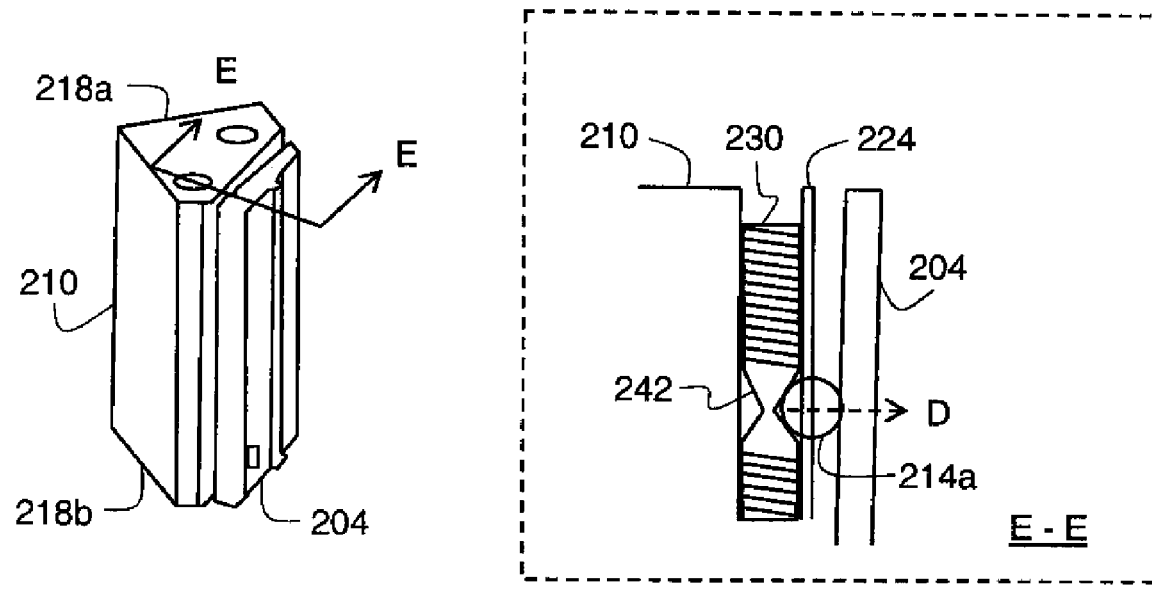
FIG. 2B is a partial cutaway view showing pitch adjustment components in an alternate embodiment.

Alternately, the conical taper may be provided in the midsection of the adjustment screws, resulting in hour-glass-shaped interior portions. This alternate configuration is shown in the embodiment of FIG. 2B, in which threaded pitch adjustment insert 230 has a tapered section 242. In this embodiment, threaded pitch adjustment insert 230 can be installed from either top or bottom mounting surfaces 218a or 218b. An advantage of this arrangement is that the threaded pitch adjustment insert 230 can be adjusted from either top or bottom mounting surfaces 218a or 218b without needing to remove the threaded pitch adjustment insert 230 and insert it from the other direction. To enable this feature, both ends of the threaded pitch adjustment insert 230 are provided with an adjustment means, such as a screwdriver slot or an Allen wrench head, which can be used to turn the threaded pitch adjustment insert 230 within the pitch adjustment cavity 224.

In an alternate embodiment of the present invention, the conical or tapered slugs are inserted into the yaw adjustment cavity 220 and the pitch adjustment cavity 224 between the adjustment screws and the balls. The adjustment screws push on the conical or tapered slugs, which in turn push the pitch adjustment ball 214a, and the yaw adjustment ball 214c in or out accordingly.

The yaw adjustment cavity 220 and the pitch adjustment cavity 224 may have a uniform diameter all the way through the base member 210. Alternately, the yaw adjustment cavity 220 and the pitch adjustment cavity 224 can have a larger diameter near one or both mounting surfaces to provide easier access to the yaw adjustment insert 228 and the pitch adjustment insert 230 using adjustment tools such as Allen wrenches. It is particularly advantageous to use a larger diameter cavity when the adjustment inserts are positioned a relatively large distance from the mounting surface. For the example shown in FIG. 1, it can be seen that the yaw adjustment cavity 220 has a larger diameter toward the bottom mounting surface 218b and the pitch adjustment cavity 224 has a larger diameter toward the top mounting surface 218a.

Only the portions of the yaw adjustment cavity 220 and the pitch adjustment cavity 224 near the pitch adjustment ball 214a and the yaw adjustment ball 214c, respectively, need to be threaded to engage the threads on the yaw adjustment insert 228 and the pitch adjustment insert 230.

In one embodiment of the present invention, the axes of yaw adjustment cavity 220 and the pitch adjustment cavity 224 can be offset relative to the bores for the pitch adjustment ball 214a and the yaw adjustment ball 214c. This will force the adjustment ball to one side of the bore, thereby eliminating possible "hunting" or lost motion during adjustment as the adjustment ball wanders from one side of the bore to another.

Threaded yaw adjustment insert 228 is shown in both of its possible orientations as it would be threaded into threaded yaw adjustment cavity 220; only one orientation would be used for any single optical mount 200. In similar fashion, a threaded pitch adjustment insert 230 is shown in both of its possible orientations.

Mounting holes 240 are also provided on the top mounting surface 218a and the bottom mounting surface 218b. These holes can be used to fasten the optical mount 200 to an external chassis from either the top or bottom directions. Typically, the mounting holes 240 are threaded and the optical mount 200 is fastened to the external chassis using threaded screws.

For yaw adjustment, or rotation about the y-axis using the axes designations of FIG. 1, threaded yaw adjustment insert 228 adjusts the position of yaw adjustment ball 214c in its socket. This repositioning causes a slight change in the position of the plane formed by the 3-point contact, effecting a slight shift in yaw for frame 204 and the optical component that it supports, here, reflective element 202.

For pitch adjustment, or rotation about the x-axis using the axes designations of FIG. 1, threaded pitch adjustment insert 230 adjusts the position of ball pitch adjustment ball 214a in its socket. This repositioning also causes a slight change in the position of the plane formed by the 3-point contact, effecting a slight shift in pitch for frame 204 and the optical component that it supports.

The position of fixed ball 214b is not adjusted for the mirror mount embodiment shown in FIG. 1. Fixed ball 214b, seated in a socket 232, provides a pivot point for both pitch and yaw adjustments. A V-channel 234 extending lengthwise along frame 204 provides low-friction contact for yaw rotation of frame 204.

Figure 3A:
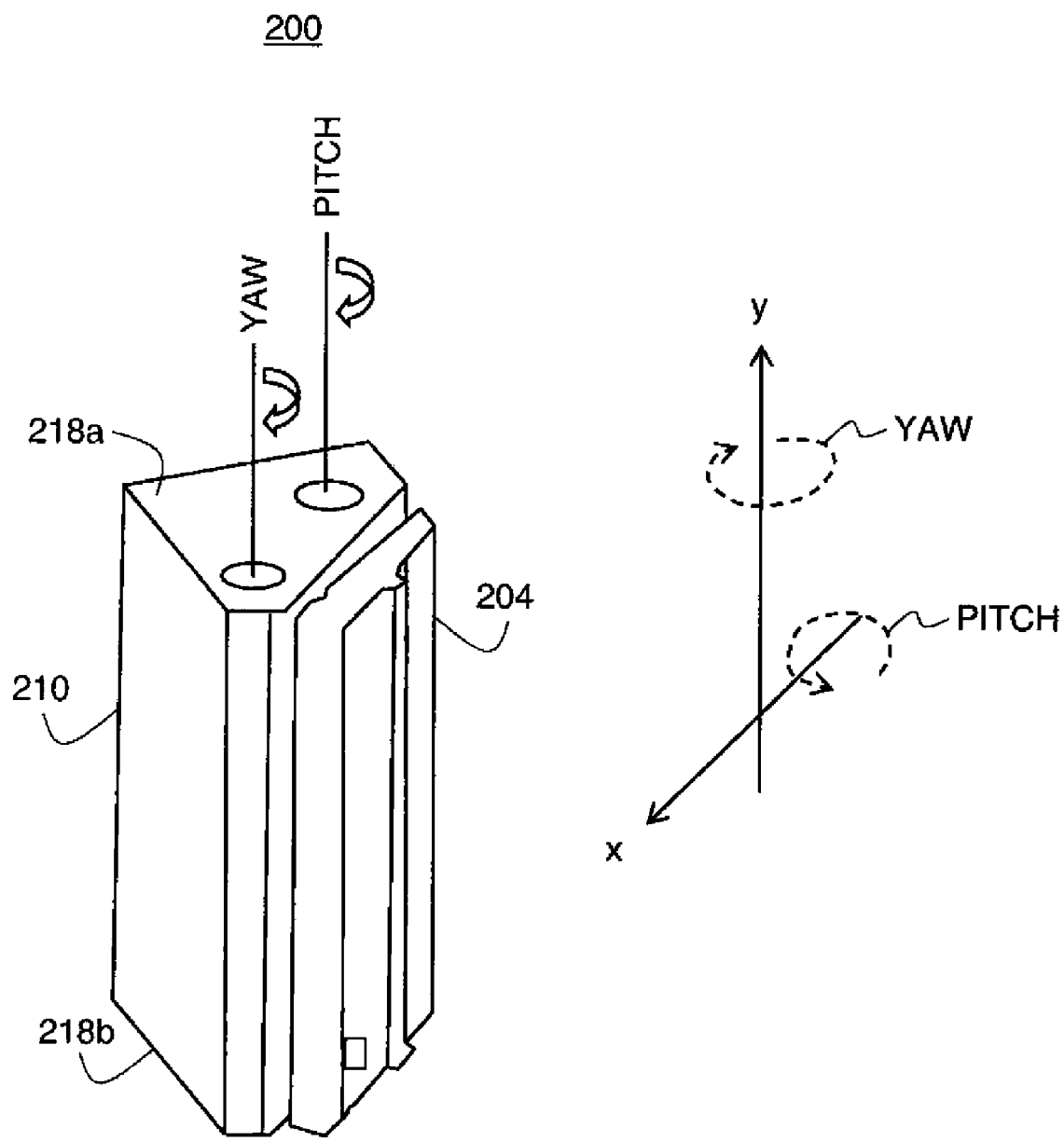
FIGS. 3A and 3B show optical mount configurations allowing pitch and yaw adjustment from either the top surface or the bottom surface of the optical mount, respectively.
Figure 3B:
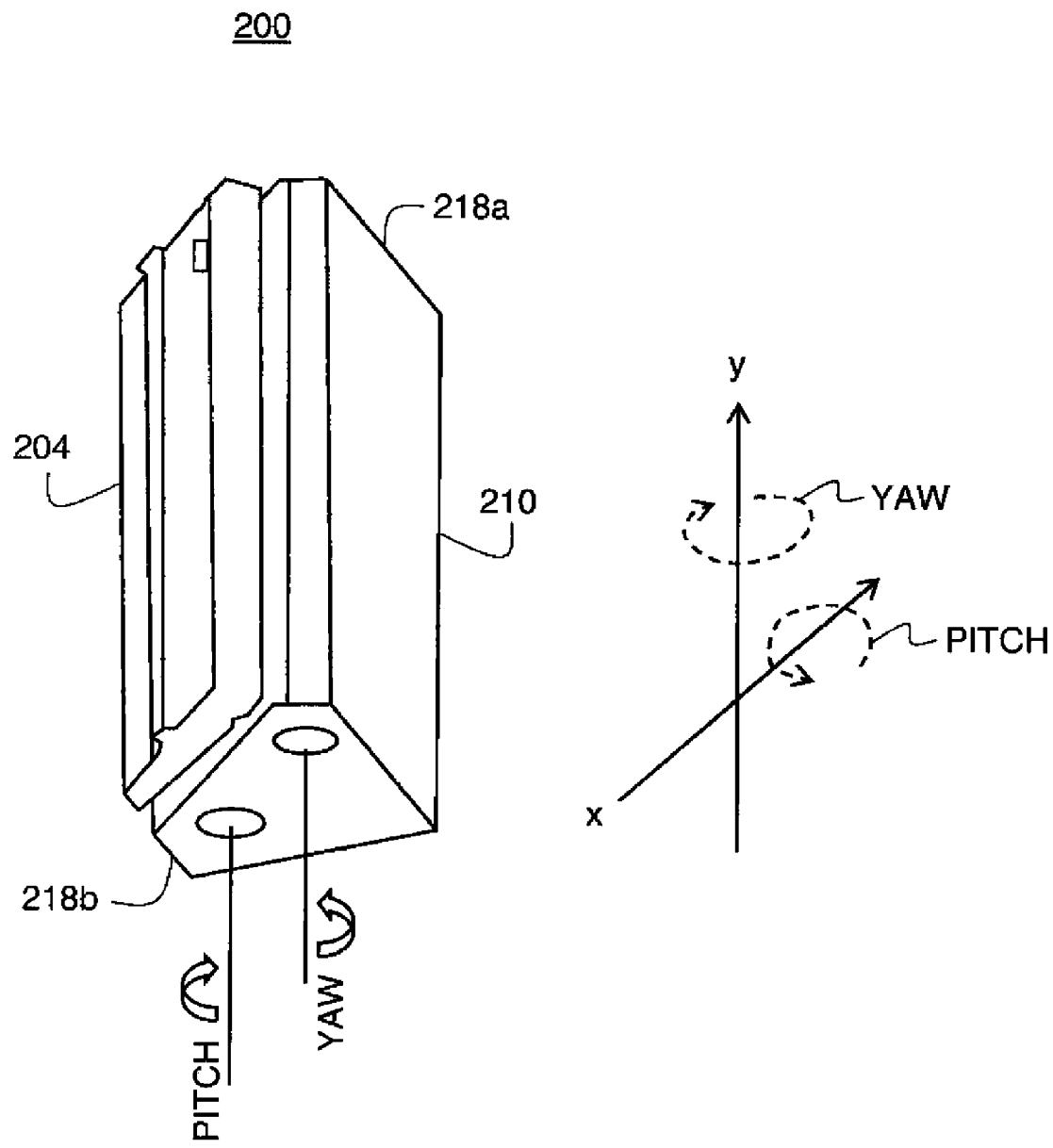

FIGS. 3A and 3B show how optical mount 200 can be configured to allow pitch and yaw adjustment from either top surface 218a or bottom surface 218b, respectively. For the configuration of FIG. 3A, the threaded yaw adjustment insert 228 and the threaded pitch adjustment insert 230 are inserted from top surface 218a, and the pitch and yaw adjustments can therefore be accessed from the top surface 218a. For the configuration of FIG. 3B, the threaded yaw adjustment insert 228 and the threaded pitch adjustment insert 230 are inserted from bottom surface 218b, and the pitch and yaw adjustments can therefore be accessed from the bottom surface 218b.

Reflective element 202 is adhesively bonded to frame 204 in one preferred embodiment. Alternatively, some other method of coupling or attachment can be provided for the optical component, including the use of a bracket or fastener, for example. In an alternate embodiment, reflective element 202 is formed directly onto frame 204, rather than being a separate component.

Figure 4:
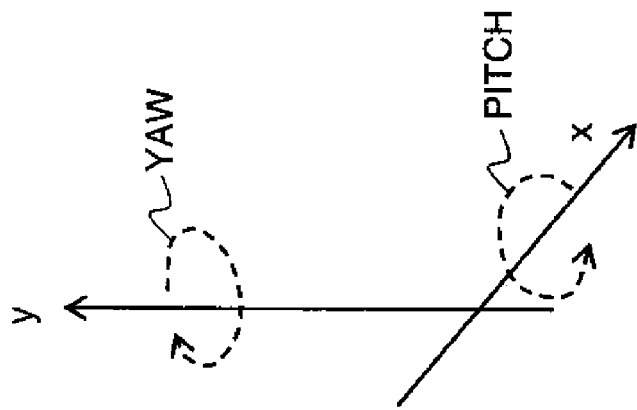
FIG. 4 is a perspective of an alternate embodiment in which a pair of optical mounts are installed back-to-back against a chassis.
Figure 4:
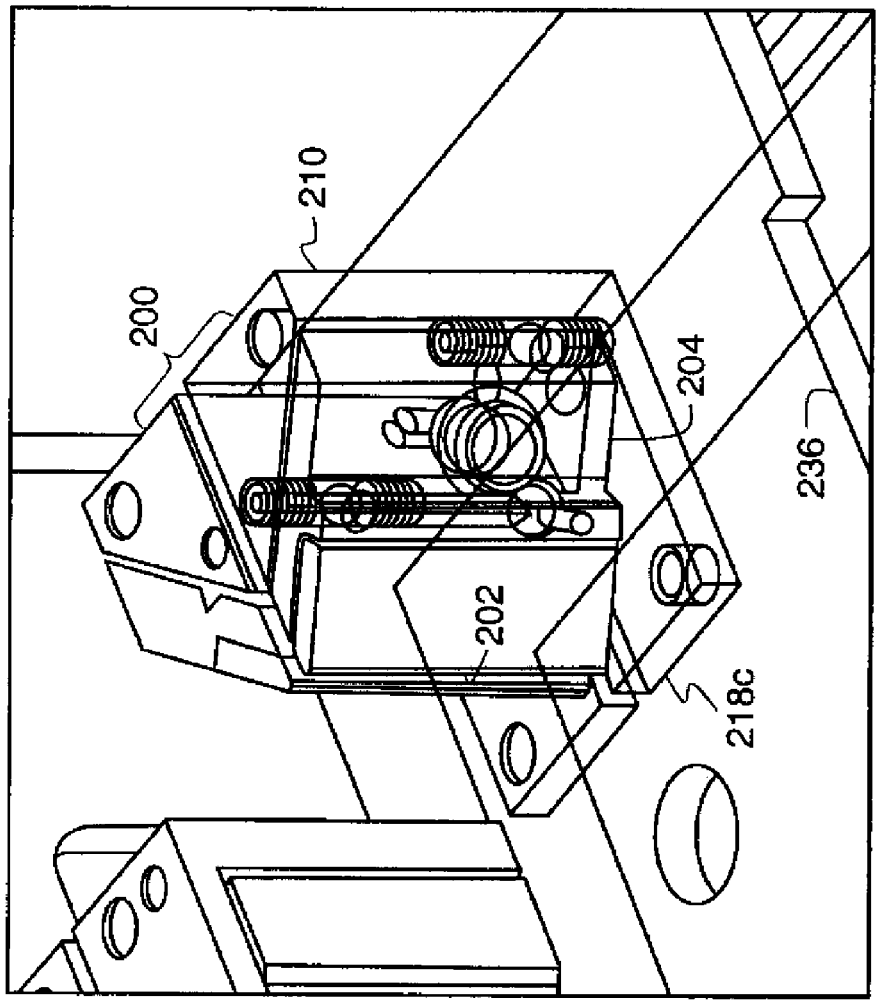

The perspective view of FIG. 4 shows an alternate embodiment in which a pair of optical mounts 200 are installed back-to-back against a chassis 236 within an optical assembly. In this embodiment, base member 210 has a broadened mounting surface 218c that has a broadened area for mounting. However, as with the FIG. 1 embodiment, access for pitch and yaw adjustment can be from the direction of the top surface 218a, as viewed in FIG. 3A, or from bottom surface 218c, as viewed in FIG. 3B, again depending on the orientation of threaded yaw adjustment insert 228 and the threaded pitch adjustment insert 230.

Figure 5:
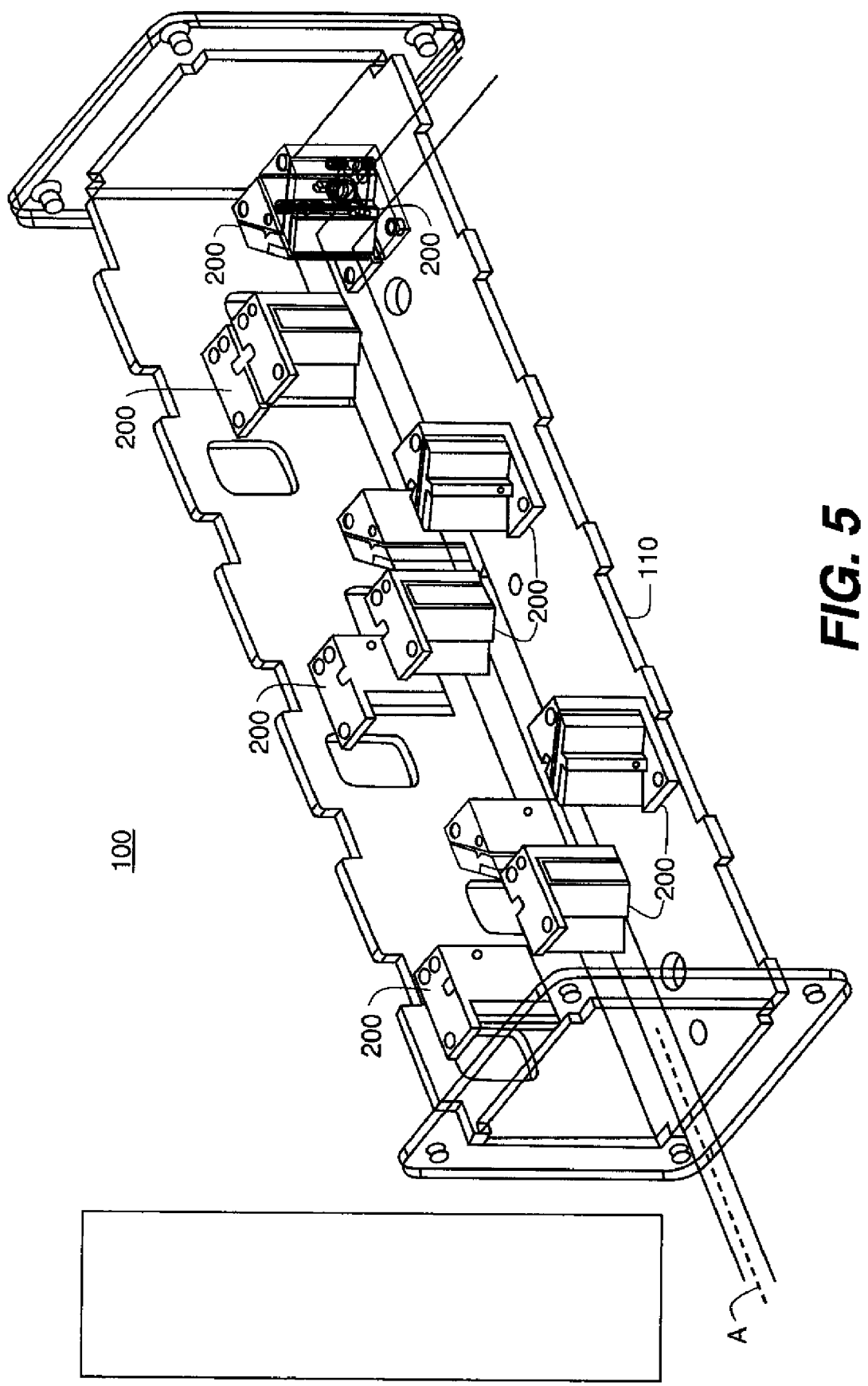
FIG. 5 is a perspective of a beam combiner assembly using a number of optical mounts for alignment of light beams from multiple sources.

Optical mount 200 of the present invention is particularly suited for use in an array configuration, such as that shown in cutaway perspective in FIG. 5. A beam alignment chamber 100 has a number of optical mounts 200 installed along a base 110 and along a top cover (removed for clarity). Beam alignment chamber 100 redirects light beams from multiple sources (not shown), each beam source coupled with a corresponding reflector in an optical mount 200, to provide light along an output path A. With this type of arrangement, a separate adjustment is provided for each beam, simplifying the beam alignment task.

Using optical mount 200 of the present invention, pitch and yaw adjustment for an optical component does not require fixturing and can be configured to be performed from either of two directions without the need for fabricating different sets of components for the different configurations. Adjustment of pitch and yaw can be made over a few degrees in each orthogonal direction and the position maintained due to the magnetic force and three-point mounting that is provided.

The use of magnetic loading for this kinematic mount helps to reduce the parts count and provides a kinematic loading force that is sufficiently robust for mounting and accurately positioning a mirror or other optical component. In another embodiment of the present invention, the base member 210 can be magnetized to provide the attraction force, thereby eliminating the need for magnet 212. In yet another embodiment of the present invention, the magnet 212 can be replaced by a spring or other type of attraction means that provides the kinematic loading force needed to hold the frame 204 tightly against the three contact points. It can be appreciated that other attraction means could be employed in various embodiments, such as gravity, elastic tension, or fluid pressure, for example.

Figure 6A:
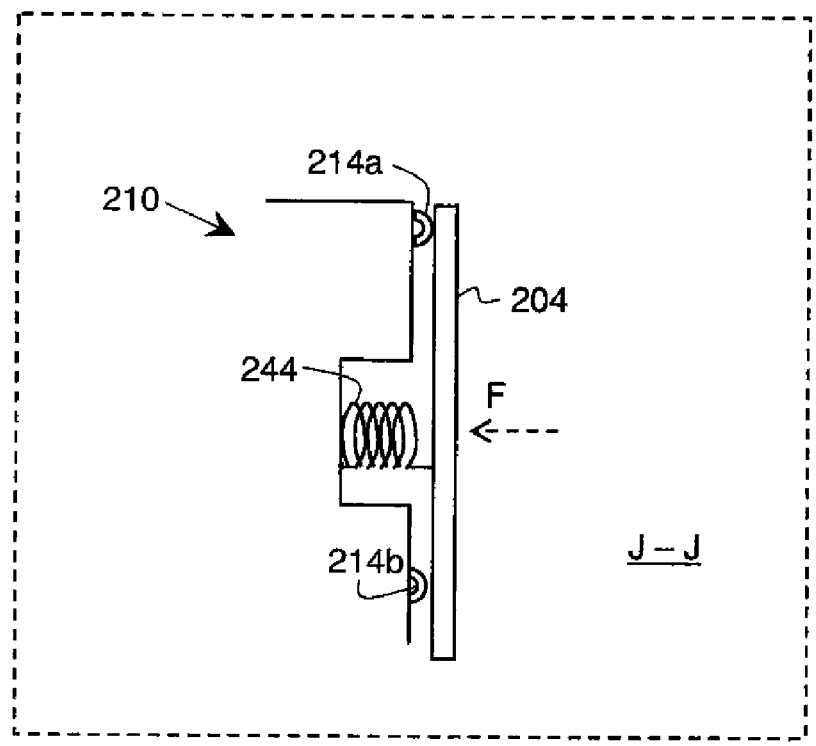
FIGS. 6A and 6B are schematic diagrams showing the use of springs for providing kinematic loading force in alternate embodiments.
Figure 6A:
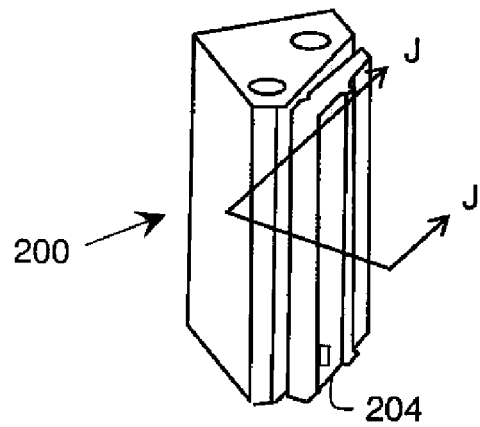
Figure 6B:
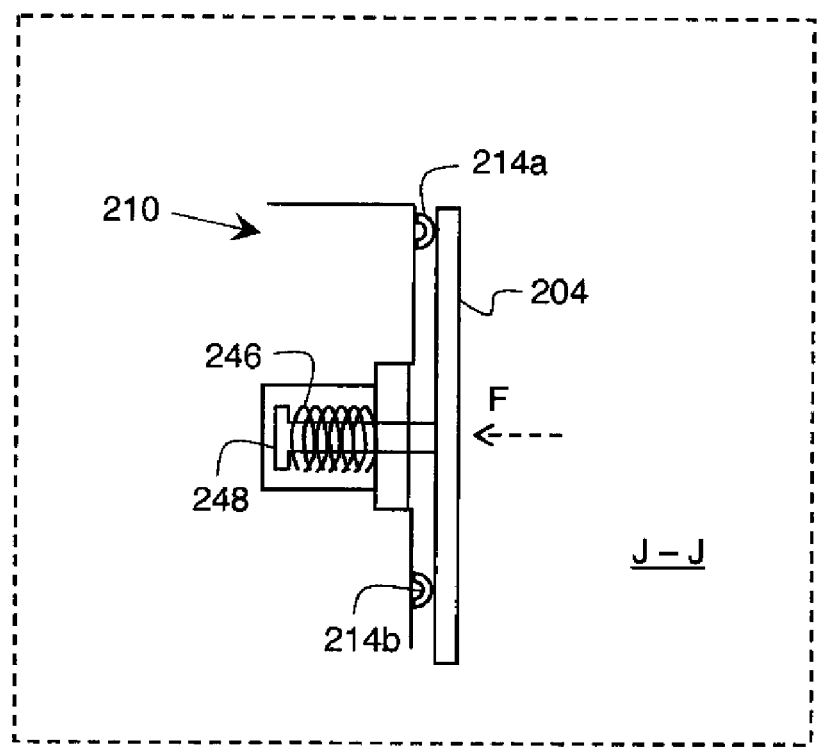
Figure 6B:
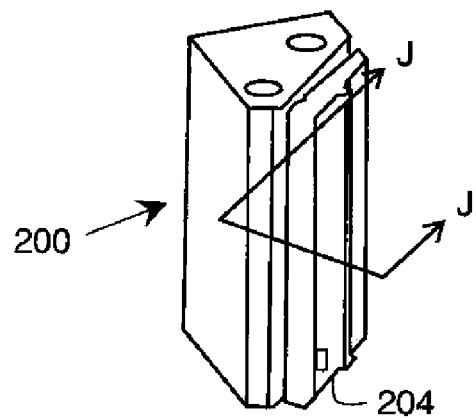

An alternate embodiment of the present invention using a spring as the attraction means is shown in the partial cutaway view of FIG. 6A, in which an extension spring 244 extends from base member 210 to provide a kinematic loading force F. Another arrangement using a spring is shown in the partial cutaway view of FIG. 6B. In this case, a compression spring 246 cooperates with an arm 248 that is coupled to frame 210 to provide the loading force F that attracts frame 204 toward base member 210. This configuration has the added advantage that it can limit the excursion of the frame 204 during a shock event. This can also prevent the pitch adjustment ball 214a, the fixed ball 214b and the yaw adjustment ball 214c from becoming dislodged during such shock events.

Base member 210 and frame 204 can be formed of various types of steel or other metals or from ceramics or other materials having suitable magnetic permeability and other properties. Base member 210 need not have a high magnetic permeability, but this characteristic can be advantageous for providing an improved flux distribution for providing the kinematic loading when a magnetic attraction means is used. Electrical-Discharge Machining (EDM) can be used to fabricate either or both of base member 210 and frame 204. Other automated or manual machining methods such as die casting or extrusion can alternately be employed.

The invention has been described in detail with particular reference to certain preferred embodiments thereof but it will be understood that variations and modifications can be effected within the spirit and scope of the invention. For example, base member 210 can be a magnetic or magnetized material, rather than housing a separate magnet. Optical mount 200 can also be configured to support other types of optical elements beside the simple reflective element 202 shown in the preceding examples. For example, optical mount 200 can also be configured to support a partially reflective element such as a beam splitter, or a refractive element or some other type of optical element that transmits light. The optical mount of the present invention can be used for accurate positioning of an optical component that redirects, filters, reflects, blocks, or transmits light or otherwise conditions incident light. Thus, what is provided is an apparatus and method for mounting an optical element.

PARTS LIST

100 Beam alignment chamber
110 Base
200 Optical mount
202 Reflective element
204 Frame
210 Base member
212 Magnet
214a Pitch adjustment ball
214b Fixed ball
214c Yaw adjustment ball
218a Top mounting surface
218b Bottom mounting surface
218c Broadened mounting surface
220 Yaw adjustment cavity
222 Cavity
224 Pitch adjustment cavity
228 Threaded yaw adjustment insert
230 Threaded pitch adjustment insert
232 Socket
234 V-channel
236 Chassis
238. Tapered end
240 Mounting holes
242. Tapered section
244. Extension spring
246. Compression spring
248. Arm
A. Output path
F. Loading force
x, y. Axis

What is claimed is:

1. A kinematic optical mount comprising:
   an optical element;
   a frame supporting the optical element;
   a base member having first, second, and third point contacts, the base member having a first surface configured for fastening to a chassis and a second surface opposite to the first surface;
   an attraction means providing an attractive force to attract the frame to the base member seating the frame against the first, second, and third point contacts
   a threaded yaw adjustment cavity extending through the base member from the first surface to the second surface;
   a threaded yaw adjustment insert that enables adjustment for re-positioning the first point contact from the direction of the first surface when inserted in the threaded yaw adjustment cavity in a first orientation and enables adjustment for re-positioning the first point contact from the direction of the second surface when inserted in the threaded yaw adjustment cavity in an opposite orientation;
   a threaded pitch adjustment cavity extending through the base member from the first surface to the second surface; and
   a threaded pitch adjustment insert that enables adjustment for re-positioning the second point contact from the direction of the first surface when inserted in the threaded pitch adjustment cavity in a first orientation and enables adjustment for re-positioning the second point contact from the direction of the second surface when inserted in the threaded pitch adjustment cavity in an opposite orientation.

2. The kinematic optical mount of claim 1 wherein the second surface is also configured for mounting to a chassis.

3. The kinematic optical mount of claim 1 wherein the first point contact is a spherical element.

4. The kinematic optical mount of claim 1 wherein the second point contact is a spherical element.

5. The kinematic optical mount of claim 1 wherein the threaded yaw adjustment insert is a screw.

6. The kinematic optical mount of claim 5 wherein the threaded yaw adjustment screw has a conical taper.

7. The kinematic optical mount of claim 5 further including a conical or wedge-shaped slug positioned between the threaded yaw adjustment screw and the first point contact.

8. The kinematic optical mount of claim 1 wherein the threaded pitch adjustment insert is a screw.

9. The kinematic optical mount of claim 8 wherein the threaded pitch adjustment screw has a conical taper.

10. The kinematic optical mount of claim 8 further including a conical or wedge-shaped slug positioned between the threaded pitch adjustment screw and the second point contact.

11. The kinematic optical mount of claim 1 wherein the threaded pitch adjustment insert or the threaded yaw adjustment insert is a screw having a tapered midsection thereby enabling the re-positioning of the corresponding point contact from the direction of either the first or second surfaces.

12. The kinematic optical mount of claim 1 wherein the attraction means is a magnet seated in the base member.

13. The kinematic optical mount of claim 1 wherein the base member is magnetized to provide the attraction means.

14. The kinematic optical mount of claim 1 wherein the attraction means is provided by a spring.

15. The kinematic optical mount of claim 1 wherein the optical element is a reflective element.

16. The kinematic optical mount of claim 1 wherein the optical element is a partially reflective element.

17. The kinematic optical mount of claim 1 wherein the optical element is a refractive element.

18. The kinematic optical mount of claim 1 wherein the base member is magnetized.

19. The kinematic optical mount of claim 1 wherein the optical element is formed onto the frame.

20. A method for mounting a light-redirecting optical element comprising:
   providing a frame that supports the light-redirecting optical element;
   providing a base member having first and second adjustable point contacts and a pivot point contact and wherein the base member provides an attractive force to seat the frame against the first and second adjustable point contacts and the pivot point contact, and wherein the base member further provides a first mounting surface and an alternate second mounting surface;
   providing a yaw adjustment for adjusting the first adjustable point contact using a threaded yaw adjustment element inserted into a yaw adjustment cavity that extends through the base member from the first mounting surface to the second mounting surface;
   providing a pitch adjustment for adjusting the second adjustable point contact using a threaded pitch adjustment element inserted into a pitch adjustment cavity that extends through the base member from the first mounting surface to the second mounting surface;

wherein at least one of the threaded yaw and pitch adjustment elements can alternately be installed from the direction of either the first or second mounting surfaces thereby enabling adjustment of the corresponding adjustable point contact from the direction of the first mounting surface when inserted in the corresponding adjustment cavity from the direction of the first mounting surface and enabling adjustment of the corresponding adjustable point contact from the direction of the second mounting surface when inserted in the corresponding adjustment cavity from the direction of the second mounting surface.

21. The method of claim 20 wherein the attractive force is provided by mounting a magnet within the base member.

22. The method of claim 20 wherein the attractive force is provided by a spring.

23. The method of claim 22 wherein the point contacts are spherical point contacts.

* * * * *